United States Patent
Sugawara et al.

(10) Patent No.: US 9,824,703 B2
(45) Date of Patent: Nov. 21, 2017

(54) MAGNETIC RECORDING AND REPRODUCING DEVICE HAVING MAGNETIC HEAD WITH FIRST AND SECOND REPRODUCING ELEMENT PORTIONS AND MAGNETIC REPRODUCING METHOD

(71) Applicant: KABUSHIKI KAISHA TOSHIBA, Tokyo (JP)

(72) Inventors: Katsuya Sugawara, Kanagawa (JP); Tomoyuki Maeda, Kanagawa (JP); Kenichiro Yamada, Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 15/258,509

(22) Filed: Sep. 7, 2016

(65) Prior Publication Data

US 2017/0243604 A1    Aug. 24, 2017

(30) Foreign Application Priority Data

Feb. 18, 2016  (JP) .................................. 2016-028776

(51) Int. Cl.

| | | |
|---|---|---|
| *G11B 15/12* | (2006.01) | |
| *G11B 5/39* | (2006.01) | |
| *G11B 5/48* | (2006.01) | |
| *G11B 15/02* | (2006.01) | |
| *G11B 5/49* | (2006.01) | |
| *G11B 19/02* | (2006.01) | |

(52) U.S. Cl.
CPC ............ *G11B 5/3912* (2013.01); *G11B 5/486* (2013.01); *G11B 5/4984* (2013.01); *G11B 15/02* (2013.01); *G11B 15/12* (2013.01); *G11B 19/02* (2013.01)

(58) Field of Classification Search
None
See application file for complete search history.

(56) References Cited

U.S. PATENT DOCUMENTS

| | | | |
|---|---|---|---|
| 8,947,806 B1* | 2/2015 | Oenning | G11B 5/012 360/39 |
| 9,093,119 B1 | 7/2015 | Hwang et al. | |
| 2003/0123198 A1 | 7/2003 | Sugawara et al. | |
| 2006/0198291 A1* | 9/2006 | Teguri | B82Y 10/00 369/277 |

(Continued)

FOREIGN PATENT DOCUMENTS

| | | |
|---|---|---|
| JP | 2003-69109 | 3/2003 |
| JP | 2014-182848 | 9/2014 |

*Primary Examiner* — Tan X Dinh
(74) *Attorney, Agent, or Firm* — Finnegan, Henderson, Farabow, Garrett & Dunner, L.L.P.

(57) ABSTRACT

According to one embodiment, a magnetic recording and reproducing device includes a magnetic recording medium, a magnetic head, and a processor. The magnetic head includes a first reproducing element portion and a second reproducing element portion. The processor is configured to acquire a first signal and a second signal, and to output an output signal according to either one of the first signal and the second signal. The first signal is obtained by reproducing information recorded on a first recording region by the first reproducing element portion. The second signal is obtained by reproducing the information recorded on the first recording region by the second reproducing element portion.

19 Claims, 8 Drawing Sheets

(56) References Cited

U.S. PATENT DOCUMENTS

| | | | |
|---|---|---|---|
| 2009/0002868 A1* | 1/2009 | Mallary | B82Y 10/00 |
| | | | 360/55 |
| 2014/0063644 A1* | 3/2014 | Lou | G11B 5/4886 |
| | | | 360/75 |
| 2014/0139940 A1* | 5/2014 | Ong | G11B 5/012 |
| | | | 360/39 |
| 2014/0281807 A1 | 9/2014 | Tashiro et al. | |
| 2015/0092295 A1* | 4/2015 | Cherubini | G11B 20/1202 |
| | | | 360/63 |
| 2015/0187384 A1* | 7/2015 | Song | G11B 20/10046 |
| | | | 360/32 |
| 2015/0356988 A1* | 12/2015 | Pokharel | G11B 5/6005 |
| | | | 360/48 |
| 2016/0035384 A1* | 2/2016 | Hwang | G11B 5/56 |
| | | | 360/45 |

\* cited by examiner

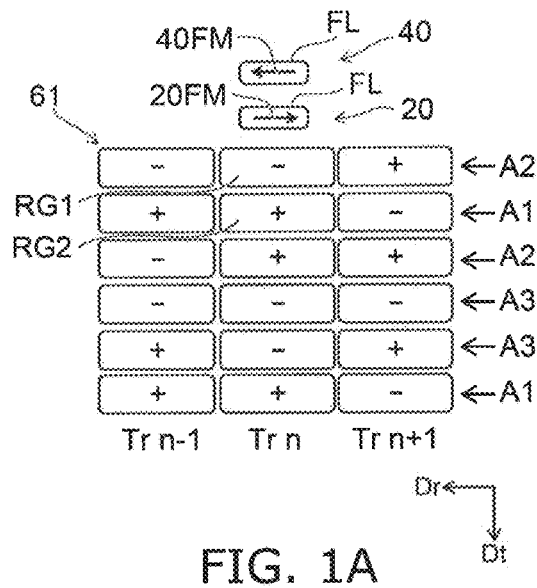
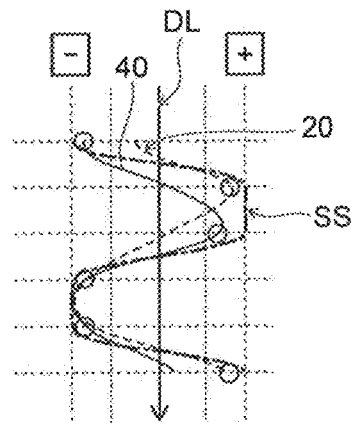
FIG. 1A
FIG. 1B
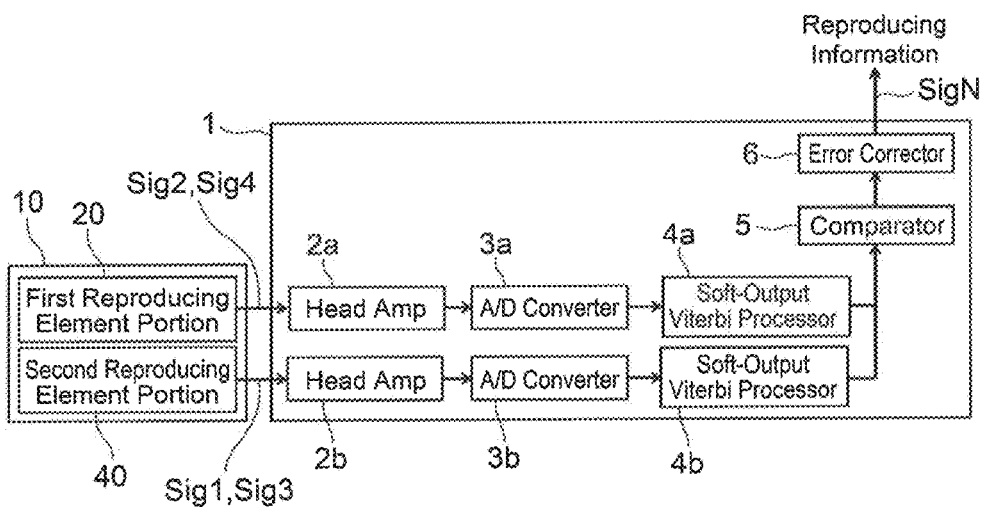
FIG. 2

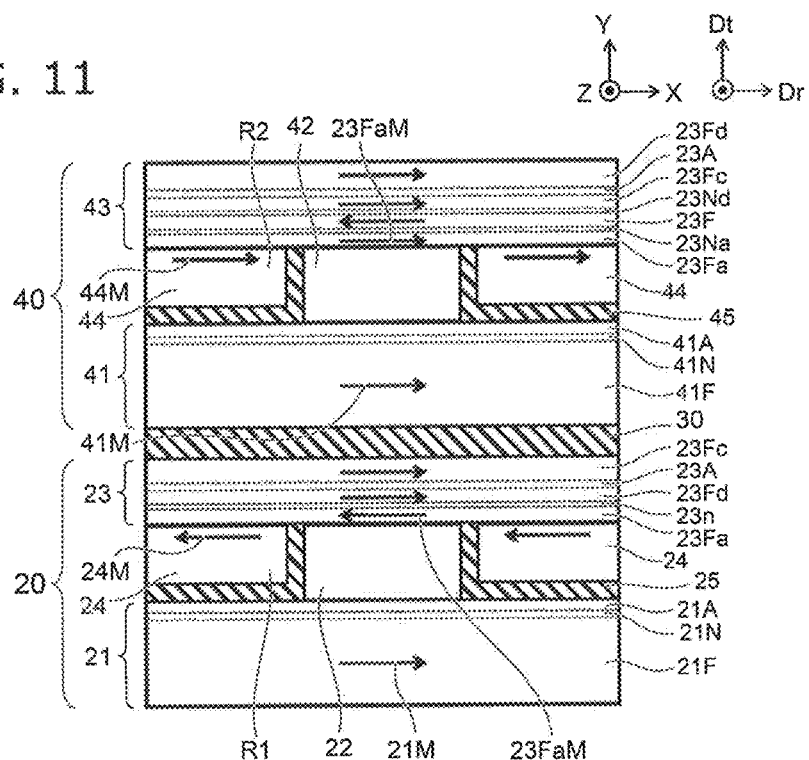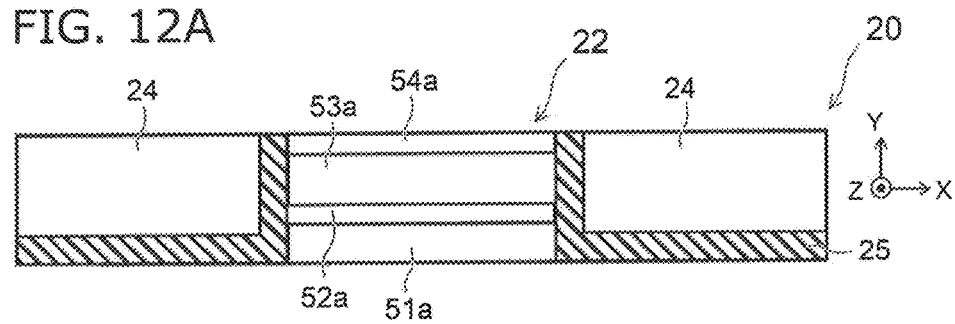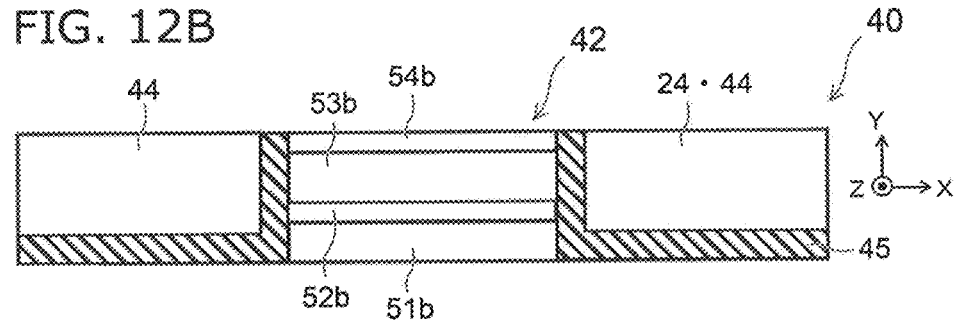

| | Material | Thickness |
|---|---|---|
| 43 | CoFe/Ru/CoFe/Ru/CoFe/IrMn/NiFe | 10nm/0.8nm/10nm/0.8nm/10nm/5nm/50nm |
| 42 | FIG.14 | FIG.14 |
| 41 | NiFe/Ta/IrMn | 10nm/1.5nm/5nm |
| 30 | Al₂O₃ | 15nm |
| 23 | CoFe/Ru/CoFe/IrMn/NiFe | 10nm/0.8nm/10nm/5nm/5nm |
| 22 | FIG.14 | FIG.14 |
| 21 | NiFe/Ta/IrMn | 2um/1.5nm/5nm |
| 24 | NiFe | 28nm |
| 44 | NiFe | 28nm |

FIG. 13

| | Material | Thickness |
|---|---|---|
| 51 | CoFe/Ru/CoFe | 5nm/0.8nm/5nm |
| 52 | MgO | 1nm |
| 53 | CoFeB/NiFe/CoFe | 0.5nm/5nm/0.5nm |
| 54 | Ru | 0.8nm |

FIG. 14

MAGNETIC RECORDING AND REPRODUCING DEVICE HAVING MAGNETIC HEAD WITH FIRST AND SECOND REPRODUCING ELEMENT PORTIONS AND MAGNETIC REPRODUCING METHOD

CROSS-REFERENCE TO RELATED APPLICATIONS

This application is based upon and claims the benefit of priority from Japanese Patent Application No. 2016-028776, filed on Feb. 18, 2016; the entire contents of which are incorporated herein by reference.

FIELD

Embodiments described herein relate generally to a magnetic recording and reproducing device, and a magnetic reproducing method.

BACKGROUND

A reproducing element is provided in heads, such as HDD (Hard Disk Drive). A magneto-resistive effect element is used for the reproducing element. In HDDs, for improving the storage density, reducing the head noise is demanded in addition to improving the reproducing resolution.

It is considered that the head noise of HDD is influenced by a skew. The skew corresponds to a relative angle between the direction of a track circumference and the head in an on-track state. Further, it is considered that the head noise of HDD is influenced by an external vibration, an external magnetic field and so on.

Various solutions have been tried until now for reducing the head noise. A solution is not enough for noise caused by the magnetization direction of the free layer of the reproducing element portion of the head and the magnetic field in the cross track direction of the magnetic recording medium.

BRIEF DESCRIPTION OF THE DRAWINGS

FIG. 1A and FIG. 1B are schematic views showing an operation of the magnetic recording and reproducing device according to a first embodiment;

FIG. 2 is a schematic view illustrating the magnetic recording and reproducing device according to the embodiments;

FIG. 11 is a schematic plan view illustrating a part of the magnetic recording and reproducing device according to the embodiments;

FIG. 12A and FIG. 12B are schematic plan views illustrating a part of the magnetic recording and reproducing devices according to the embodiments;

FIG. 13 is a table showing the configuration of a part of the magnetic recording and reproducing device according to the first embodiment; and FIG. 14 is a table showing the configuration of a part of the magnetic recording and reproducing device according to the first embodiment.

DETAILED DESCRIPTION

Figure 3:
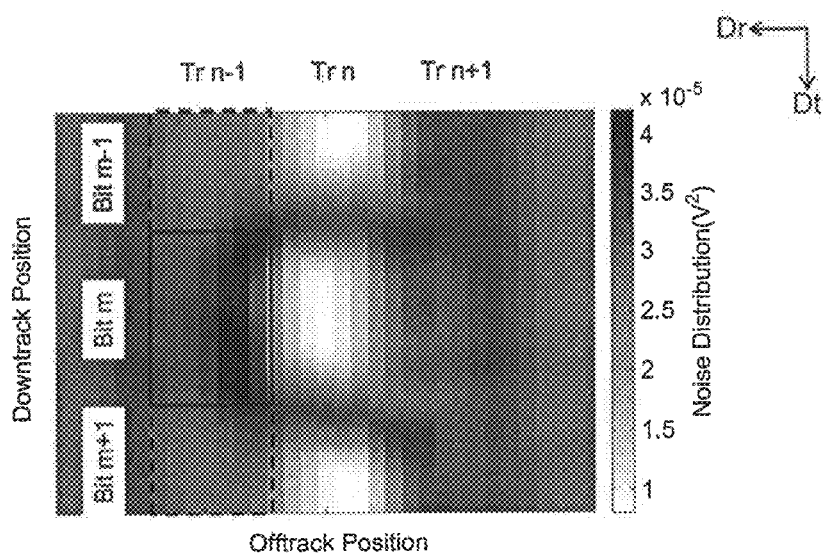
FIG. 3 is a schematic view illustrating characteristics of the magnetic recording and reproducing device according to the first embodiment.

According to one embodiment, a magnetic recording and reproducing device includes a magnetic recording medium, a magnetic head, and a processor. The magnetic head includes a first reproducing element portion and a second reproducing element portion. The processor is configured to acquire a first signal and a second signal, and to output an output signal according to either one of the first signal and the second signal. The first signal is obtained by reproducing information recorded on a first recording region by the first reproducing element portion. The second signal is obtained by reproducing the information recorded on the first recording region by the second reproducing element portion.

Embodiments will now be described with reference to the drawings.

The drawings are schematic or conceptual; and the relationships between the thicknesses and widths of portions, the proportions of sizes between portions, etc., are not necessarily the same as the actual values thereof. Further, the dimensions and/or the proportions may be illustrated differently between the drawings, even in the case where the same portion is illustrated.

In the drawings and the specification of the application, components similar to those described in regard to a drawing thereinabove are marked with like reference numerals, and a detailed description is omitted as appropriate.

A magnetic recording and reproducing device includes a magnetic recording medium. In the magnetic recording medium, many magnetic recording tracks having an approximately concentric form are provided. Bit information is recorded on these recording tracks. Record is magnetic recording, for example.

Bit information is recorded on the recording tracks of the magnetic recording medium. Bit information is read and reproduced by the magnetic head. The magnetic head is scanned on the recording track.

(First Embodiment)

Figure 7:
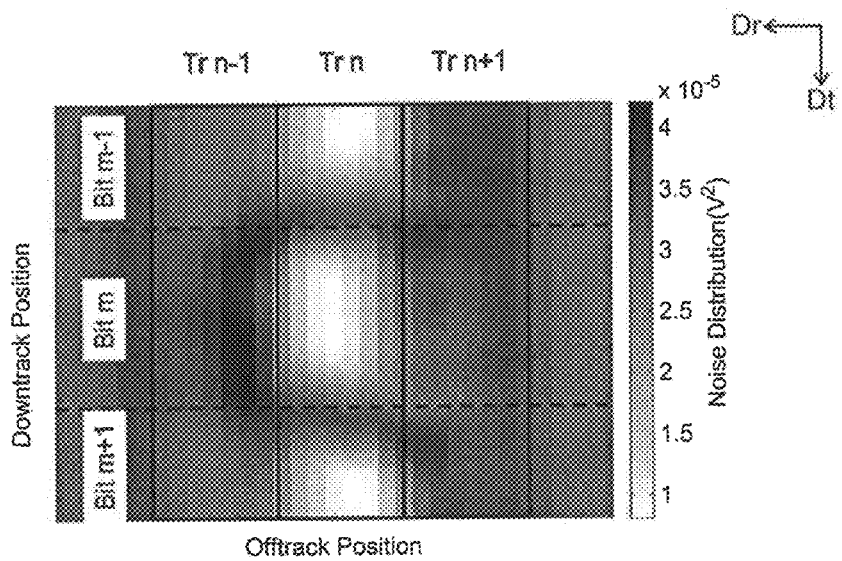
FIG. 7 is a schematic view illustrating an operating state of magnetic recording and reproducing devices.

FIG. 7 is a schematic view illustrating an operating state of magnetic recording and reproducing devices.

FIG. 7 shows an analyzed result of two-dimensional noise. The two-dimensional noise occurs when the magnetic recording medium on which bit information was recorded is reproduced by a magnetic head.

In FIG. 7, the vertical axis shows the position of the noise in a down track direction Dt of the magnetic recording medium. The horizontal axis shows the position of the noise in the cross track direction Dr.

The down track direction Dt aligns substantially along the circumference of the magnetic disk, for example. The cross track direction Dr is substantially perpendicular to the down track direction Dt. The cross track direction Dr corresponds to the radiation direction which passes the rotation axis of the magnetic disk, for example.

The contour in FIG. 7 shows the intensity of the noise. The solid line in FIG. 7 shows a boundary of the recording tracks. The dashed line in FIG. 7 shows the boundary of the recording bits. Noise distribution is shown in FIG. 7. After recording on the track Trn, reproducing is performed on each position of the down track direction Dt. The noise distribution shown in FIG. 7 shows the Intensity of the noise superimposed on the reproduced signal in such reproduction.

As shown in FIG. 7, in one track Trn, a transition noise occurs between a plurality of recording bits. The region between the plurality of recording bits are a region between the recording bit Bitm and the recording bit Bitm−1, and a region between recording bit Bitm and the recording bit Bitm+1, for example. On the other hand, in another track Trn−1 and another track Trn+1 adjacent to the track Trn, the noise alternately occurs in the regions adjacent to the recording bit of the track Trn. On the other track Trn−1, the noise becomes maximum at a position of the recording bit Bitm. On the other track Trn+1, the noise becomes maximum at positions of the recording bit Bitm−1 and the recording bit Bitm+1. The Inventors consider that the generating of the noise is influenced by an orientation of the magnetization of the free layer of the reproducing head and an orientation of the magnetic field in the cross track direction, which is produced by the recording bit on the magnetic recording medium.

Figure 8A:
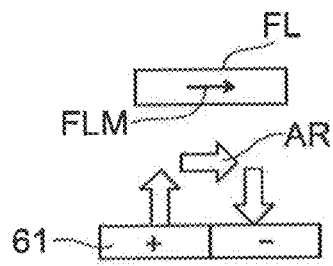
FIG. 8A to FIG. 8C are schematic views illustrating characteristics in magnetic recording and reproducing devices.
Figure 8B:
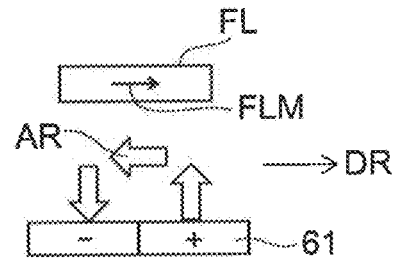
Figure 8C:
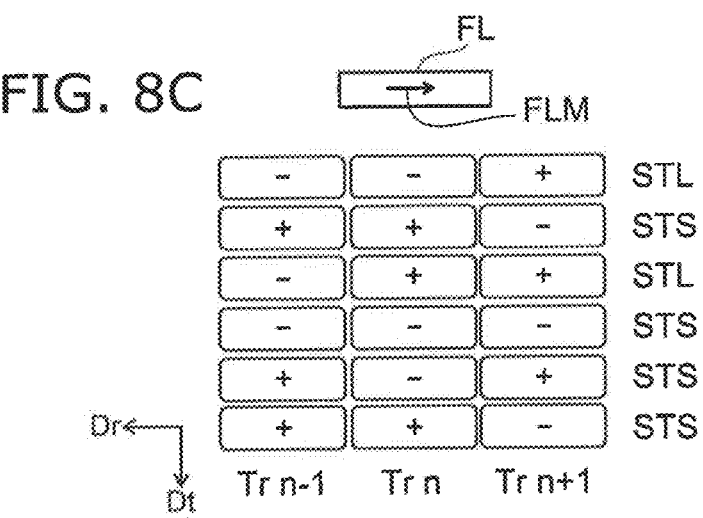

FIG. 8A to FIG. 8C are schematic views illustrating the characteristics in magnetic recording and reproducing devices.

FIG. 8A and FIG. 8B illustrate the section of the magnetic recording medium 61.

FIG. 8A and FIG. 8B show the orientation of the magnetization FLM of the free layer FL in a plane including the cross track direction Dr, and the orientation of the magnetic field of the adjacent to recording bit. In FIG. 8A and FIG. 8B, the plus sign (+) and the minus sign (−) show the states of the recording bit. Arrow AR shows the orientation of the magnetic field coming out from the magnetic recording medium 61. In vicinity of the free layer FL, the orientation of the magnetic field coming out from the magnetic recording medium 61 is parallel or anti-parallel to the cross track direction Dr.

FIG. 8A corresponds to a case where the orientation of the magnetization FLM of the free layer FL and the orientation of the magnetic field of the recording bit are parallel to each other. At this time, the noise of the reproducing head is in a small noise state STS.

FIG. 8B corresponds to a case where the orientation of the magnetization FLM of the free layer FL and the orientation of the magnetic field of the recording bit are anti-parallel to each other. At this time, the noise of the reproducing head is in a large noise state STL.

FIG. 8C corresponds to a state where the surface of the magnetic recording medium 61 is seen perpendicularly. FIG. 8C shows the strength of the noise. In FIG. 8C, the down track direction Dt and the cross track direction Dr are shown.

The orientation of the magnetization FLM of the free layer FL of the reproducing element portion is anti-parallel to the cross track direction Dr. Track Trn−1, the track Trn, and track Trn+1 are shown. In the case of reproducing the track Trn, in the recording bit on the first (top) row, a parallel magnetic field component to the cross track direction Dr is generated. The parallel magnetic field component is generated by the influence of the adjacent recording bit. In this case, the noise becomes large. On the other hand, in the recording bit on the second row, an anti-parallel magnetic field component to the cross track direction Dr is generated. In the recording bit of the second row, the noise becomes small.

A signal detecting portion is provided in the magnetic head (the magnetic head described later). The signal detecting portion includes the free layer FL. The orientation of the magnetization FM of the free layer FL influences the noise. The orientation of the magnetization FLM of the free layer FL is determined in accordance with the orientation of the magnetization of a side shield, for example.

The orientation of the magnetization FLM of the free layer FL is parallel or anti-parallel substantially to the cross track direction Dr, if there is no influence of an external magnetic field and heat fluctuation. It is considered that the noise occurs when the orientation of the magnetization FLM of the free layer FL fluctuates by the Influences of the external magnetic field and heat fluctuation.

When the orientation of the magnetic field component in the cross track direction Dr of the magnetic recording medium 61 and the orientation of the magnetization FLM of the free layer FL are anti-parallel to each other, the orientation of the magnetization FLM of the free layer FL changes. Therefore, the noise becomes large. On the other hand, when the orientation of the magnetic field component in the cross track direction Dr and the orientation of the magnetization FLM of the free layer FL are non anti-parallel to each other, the orientation of the magnetization FLM of the free layer FL is stabilized more. Therefore, the noise becomes small.

The magnetic head provided in the magnetic recording and reproducing device according to the embodiment includes two reproducing element portions. In the two reproducing element portions, the orientation of the magnetizations FLM of the free layers FL are anti-parallel to each other. By using this configuration, the above-mentioned noise can be reduced, for example.

FIG. 1A and FIG. 1B are schematic views showing an operation of the magnetic recording and reproducing device according to first embodiment.

FIG. 1A shows the recording bit of the magnetic recording medium when the surface of the magnetic recording medium is seen perpendicularly. FIG. 1A shows the orientation of the magnetization of the free layer of two reproducing element portions. FIG. 1A shows the orientation of the magnetization of two reproducing element portions, and a soft-decision information by SOVA. In FIG. 1A, a magnetization 20FM of the free layer FL of the first reproducing element portion 20 described later, and a magnetization 40FM of the free layer FL of the second reproducing element portion 40 described later 40 are illustrated. In the first reproducing element portion 20 and the second reproducing element portion 40, the orientations of the magnetization of two free layers are anti-parallel to each other.

In FIG. 1A, the down track direction Dt and the cross track direction Dr are shown. The cross track direction Dr is substantially perpendicular to the down track direction Dt. In the embodiment, two reproducing element portions which have such configuration are used. A signal is outputted from each of the two reproducing element portions. The signal having lower noise is used in the embodiment. Thereby, a signal processing reducing the influence of the noise becomes possible, for example. As shown in FIG. 1A, a plurality of recording regions (for example, a first recording region RG1, a second recording region RG2, etc.) are provided in the track Trn. Each of the plurality of recording regions corresponds to the recording bit.

For example, in three tracks shown in FIG. 1A, each of the plurality of recording bits of the track Trn is reproduced by the two reproducing element portions. In the uppermost (the first row) recording bit, the parallel magnetic field component in the cross track direction Dr is generated. In this recording bit, the noise is large in the first reproducing element portion 20, and the noise is small in the second reproducing element portion 40. In the recording bit of the second row, the anti-parallel magnetic field component to the cross track direction Dr is generated. In this recording bit, the noise is large in the second reproducing element portion 40, and the noise is small in the first reproducing element portion 20. In a first state A1 shown in FIG. 1A, the noise in in the first reproducing element portion 20 is smaller than the nose in the second reproducing element portion 40. In a second state A2 shown in FIG. 1A, the noise in in the second reproducing element portion 40 is smaller than the nose in the first reproducing element portion 20. In a third state A3 shown in FIG. 1A, the noise in in the first reproducing element portion 20 is substantially same as the nose in the second reproducing element portion 40. When the noise of one of reproducing element portions is large, the noise of the other of the producing element portions is small. One of decisions of the reproduced waveforms of the two reproducing element portions is selected. Thereby, a decision reducing the noise is possible, for example. For example, the correctness of the decision can be improved.

In FIG. 1B, a virtual soft decision result SS is shown with a dashed-dotted line. The soft decision result SS corresponds to a case without noise. In the graph of FIG. 1B, each SOVA (Soft-Output Viterbi Algorithm) soft-decision information of the first reproducing element portion 20 and the second reproducing element portion 40 is displayed to be overlapped mutually. The dotted line shown in FIG. 1B corresponds to the first reproducing element portion 20. The solid line shown in FIG. 1B corresponds to the second reproducing element portion 40. Regarding the recording bit of the central line shown in FIG. 1A, the reproduced waveform is obtained by two reproducing element portions. Two obtained reproduced waveforms are decided by soft-decision independently. The central axis (solid line) of the lengthwise direction of FIG. 1B corresponds to the decision level DL used as a standard. The decision level DL serves as a standard at the deciding + (plus) or − (minus) of the recording bit. Based on the decision level DL, when the result of SOVA soft-decision information is plus, the decision is made to be + (plus). Based on the decision level DL, when the result is minus, the decision is made to be − (minus).

The decision level DL may be predetermined. The plurality of recording bits are provided in the track Trn. For example, the reproduced waveform of the recording bit obtained by the first reproducing element portion 20 is a first reproduced waveform. The reproduced waveform of the recording bit obtained by the second reproducing element portion 40 is a second reproduced waveform. The difference (absolute value) between the first reproduced waveform and the decision level DL (the standard) differs from the difference (absolute value) between the second reproduced waveform and the decision level DL (the standard). One of differences is larger than the other of differences. A result of having the large difference is decoded to be the right bit information. For example, the round marks shown in FIG. 1B correspond to the region where the stable decision is performed.

The output signal of the first reproducing element portion 20 and the second reproducing element portion 40 is processed in the processor of the magnetic recording and reproducing device.

FIG. 2 is a schematic view illustrating the magnetic recording and reproducing device according to the embodiments.

FIG. 2 is a block diagram showing an example of a processor. FIG. 2 shows the example of the processing configuration of the processor 1. For example, the output signals (a first signal Sig1 and a third signal Sig3, etc.) from the first reproducing element portion 20 are amplified by the head amplifier 2a. The output signals (a second signal Sig2 and a fourth signal Sig4, etc.) from the second reproducing element portion 40 are amplified by the head amplifier 2b. The first signal Sig1 corresponds to a reproduced signal of one recording bit obtained by the first reproducing element portion 20. The second signal Sig2 corresponds to a reproduced signal of the one recording bit obtained by the second reproducing element portion 40. The one recording bit is a first recording region RG1, for example. The third signal Sig3 corresponds to a reproduced signal of another recording bit obtained by the first reproducing element portion 20. The fourth signal Sig4 corresponds to a reproduced signal of the another recording bit obtained by the second reproducing element portion 40. The another recording bit is a second recording region RG2, for example.

An A/D converter 3a changes the analog signal outputted from the head amplifier 2a into a digital signal. An A/D converter 3b changes the analog signal outputted from the head amplifier 2b into a digital signal. The digital signal outputted from the A/D converter 3a is supplied to the soft-decision processing portion 4a, and is processed. Thereby, first soft-decision information is obtained. The digital signal outputted from the A/D converter 3b is supplied to the soft-decision processing portion 4b, and is processed. Thereby, second soft-decision information is obtained. First soft-decision information and second soft-decision information are soft-decision information on SOVA. The comparator 5 derives a first difference in each recording bit. The first difference corresponds to the difference between the first soft-decision information and the decision level DL. The comparator 5 derives a second difference. The second difference corresponds to the difference between the second soft-decision information on each recording bit and the decision level DL.

Based on the first difference and the second difference, + (plus) or − (minus) is decided for each of the plurality of recording bits. For example, when the absolute value of the first difference is larger than the absolute value of the second difference, the comparator 5 outputs the first soft-decision information selectively. For example, when the absolute value of the first difference is smaller than the absolute value of the second difference, the comparator 5 outputs the second soft-decision information selectively. The error part of the output information selected by the comparator 5 is corrected in the error correction portion 6. The output information selected by the comparator 5 is outputted as reproduced information (signal SigN) after the correction.

The processor 1 includes an Integrated circuit, for example. The integrated circuit includes a head amplifier, for example. The integrated circuit may also include a SOC (System On Chip), for example. The processor 1 may also include at least one of a Read Write channel LSI, a microcomputer, and a HDC (Hard Disk Controller) and a SDRAMs. These integrated circuits are provided in PWD (Printed Wired Board) or PCB (Printed Circuit Board) which is provided in the magnetic recording and reproducing device, for example.

In the reproducing method in embodiment, one of the reproduced information obtained from two reproducing element portions which has a good decision result is selected for one recording bit using SOVA soft-decision information, for example. Thereby, the reproduced waveform having a suppressed influence of the noise by the magnetic field in the cross track direction is obtained, for example. For example, reproduced waveform having good SN (Signal Noise) is obtained.

FIG. 3 is a schematic view illustrating the characteristics of the magnetic recording and reproducing device according to the first embodiment.

FIG. 3 shows the improvement effect of the noise of the magnetic recording and reproducing device according to the first embodiment. FIG. 3 shows the estimated result of the Improvement effect by using the above-mentioned configuration of the two reproducing element portions and the above mentioned reproduction system.

In the embodiment, one of the two reproduced information can be selected, for example. Thereby, the reproduced information having suppressed influence of the noise by the magnetic field in the cross track direction Dr is obtained. The selection is performed for each of the plurality of recording bits. For example, in the track Trn−1, the noise occurs at the time of reproducing the recording bit Bitm shown as the solid line in FIG. 3. The noise at the time of reproducing the recording bit Bitm can be reduced to the same extent as the noise in the recording bit Bitm−1 or the recording bitm+1 shown with the dashed line in FIG. 3. The SN improvement effect at this time is about 2.26 dB.

Hereinafter, an example of the configuration of the magnetic head according to the first embodiment will be explained.

Figure 4:
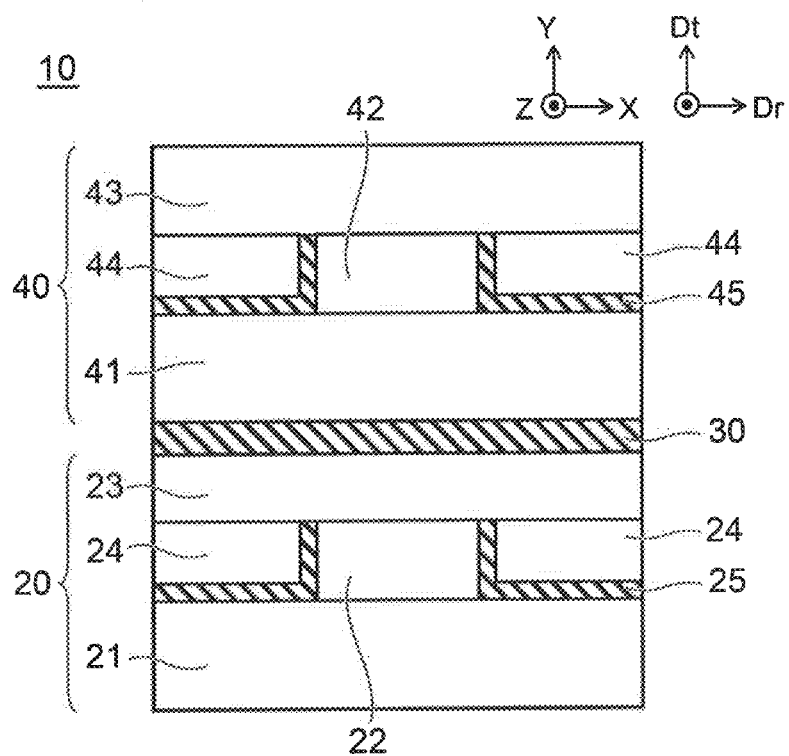
FIG. 4 is a schematic plan view showing a part of the magnetic recording and reproducing device according to the first embodiment.

FIG. 4 is a schematic plan view showing a part of the magnetic recording and reproducing device according to first embodiment.

FIG. 4 shows an example of the magnetic head 10 according to first embodiment. The magnetic head 10 includes two reproducing element portions.

The magnetic head 10 is provided in the magnetic head (a magnetic head 63 described later) of HDD (a magnetic recording and reproducing device 60 described later), for example. The magnetic recording medium (the magnetic recording medium 61 described later) is provided in HDD. The magnetic head 10 has a medium opposing face. FIG. 4 is a schematic plan view of the magnetic head 10 seen from the medium opposing face.

A direction from the first electrode 21 toward the fourth electrode 43 is taken as a first direction (Y-axis direction) in FIG. 4. The first direction is the film forming direction, for example. One direction crossing the first direction is taken as a second direction (X-axis direction). The second direction is perpendicular to the first direction, for example. The second direction corresponds to a direction from the first signal detecting portion 22 toward the first side shield 24 in FIG. 4. A direction perpendicular to the first direction and the second direction is taken as a third direction (Z-axis direction). When the influence of a skew is disregarded, in FIG. 3, the cross track direction Dr aligns along the X-axis direction. The down track direction Dt aligns along the Y-axis direction.

The magnetic head 10 includes the first reproducing element portion 20, the insulating layer 30, and the second reproducing element portion 40. The first reproducing element portion 20, the insulating layer 30, and the second reproducing element portion 40 are arranged along the first direction. The insulating layer 30 is provided between the first reproducing element portion 20 and the second reproducing element portion 40.

The first reproducing element portion 20 includes a first electrode 21, a first signal detecting portion 22, and a second electrode 23. The first electrode 21, the first signal detecting portion 22, and the second electrode 23 are arranged along the first direction. The first signal detecting portion 22 is provided between the first electrode 21 and the second electrode 23.

A pair of first side shields 24 are provided. The direction from one of the first side shields 24 toward the other of the first side shields 24 aligns along the second direction. The first signal detecting portion 22 is provided between one of the first side shields 24 and the other of the first side shields 24. A part of a first insulating portion 25 is provided between one of the first side shields 24 and the first signal detecting portion 22. The another part of the first insulating portion 25 is provided between the one of the first side shields 24 and the first electrode 21.

The second reproducing element portion 40 includes a third electrode 41, a second signal detecting portion 42, and a fourth electrode 43. The third electrode 41, the second signal detecting portion 42, and the fourth electrode 43 are arranged along the first direction. The second signal detecting portion 42 is provided between the third electrode 41 and the fourth electrode 43. A pair of second side shields 44 are provided. A direction from one of the second side shields 44 toward another of the second side shields 44 aligns along the second direction. The second signal detecting portion 42 is provided between one of the second side shields 44 and the other of the second side shields 44. A part of second insulating portion 45 is provided between one of the second side shield 44 and the second signal detecting portion 42. Another part of the second insulating portion 45 is provided between the one of the second side shields 44 and the third electrode 41.

The first signal detecting portion 22 and the second signal detecting portion 42 are magneto-resistive effect elements, for example. A pin layer and a free layer are provided in the magneto-resistive effect element. Details of the magneto-resistive effect element are described later. The recorded data on the magnetic recording medium of HDD are reproduced by the first signal detecting portion 22 of the first reproducing element portion 20 and the second signal detecting portion 42 of the second reproducing element portion 40.

The first electrode 21 and the third electrode 41 may have shielding function. The first electrode 21 and the third electrode 41 include a magnetic body, for example. The magnetic body includes a ferromagnetic substance. The magnetic body may also include an antiferromagnet.

The ferromagnetic substance includes at least one selected from the group consisting of CoFe, NiFe, CoZrTa, CoZrNb, CoZrNbTa, CoZrTaCr, and CoZrFeCr, for example. Hereinafter, CoFe, NiFe, CoZrTa, CoZrNb, CoZrNbTa, CoZrTaCr, or CoZrFeCr is called "CoFe etc."

The antiferromagnet includes at least one selected from the group consisting of IrMn and PtMn, for example. it is desirable that a thickness (the length in the first direction) of the film of the antiferromagnet (at least one of IrMn and PtMn) is not less than 5 nm and not more than 10 nm less.

Figure 5:
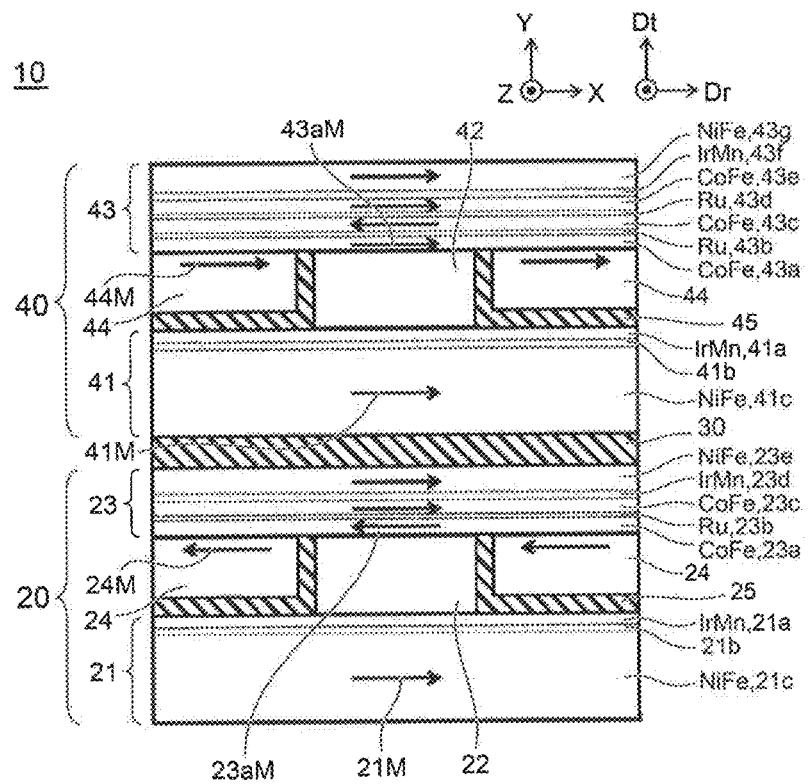
FIG. 5 is a schematic plan view illustrating a part of the magnetic recording and reproducing device according to the first embodiment.

FIG. 5 is a schematic plan view illustrating a part of the magnetic recording and reproducing device according to the first embodiment.

FIG. 5 shows an example of the electrode included in the magnetic head according to the first embodiment, and the magnetization direction the layers.

As shown in FIG. 5, the first electrode 21 and the third electrode 41 may also include a multilayered film.

A multilayered film includes a plurality of stacked films, for example. One of the plurality of films includes ferromagnetic substances, such as "CoFe", for example.

The multilayered film may also include a film of ferromagnetic substance ("CoFe etc."), and a film of the antiferromagnet (one of IrMn or PtMn, for example). These films are stacked. It is desirable that the first electrode 21 has a stacked structure of IrMn/Ta/NiFe (an antiferromagnetic layer, a foundation layer, a ferromagnetic layer) for example. In this stacked structure, the Ta layer is provided between the first signal detecting portion 22 and the NiFe layer. The IrMn layer is provided between the first signal detecting portion 22 and the Ta layer. It is desirable that the third electrode 41 has a stacked structure of IrMn/Ta/NiFe (an antiferromagnetic layer, a foundation layer, a ferromagnetic layer) for example. In this stacked structure, the Ta layer is provided between the second signal detecting portion 22 and the NiFe layer. The IrMn layer is provided between the second signal detecting portion 22 and the Ta layer. As shown in FIG. 5, the first electrode 21 includes an IrMn layer 21a, a foundation layer 21b, and a NiFe layer 21c. The IrMn layer 21a is provided between the NiFe layer 21c and the first signal detecting portion 22. The foundation layer 21b is provided between the IrMn layer 21a and the NiFe layer 21c. The foundation layer 21b is a Ta layer, for example.

The third electrode 41 includes an IrMn layer 41a, a foundation layer 41b, and a NiFe layer 41c. The IrMn layer 41a is provided between the NiFe layer 41c and the second signal detecting portion 42. The foundation layer 41b is provided between the IrMn layer 41a and the NiFe layer 41c. The foundation layer 41b is a Ta layer, for example. In this example, the orientation of the magnetization 21M of the first electrode 21 is the same as that of the magnetization 41M of the third electrode 41. In the embodiments, it is desirable that the stacked structure of the first electrode 21 is the same as the stacked structure of the third electrode 41. In the embodiments, the first electrode 21 may also include a material different from the material of the third electrode 41. The first electrode 21 may have a stacked structure different from the stacked structure of the third electrode 41.

The second electrode 23 and the fourth electrode 43 include a magnetic body, for example. The second electrode 23 and the fourth electrode 43 may also include non-magnetic metal, for example. The magnetic body includes a ferromagnetic substance ("CoFe etc.") or an antiferromagnet (one of IrMn or PtMn for example), for example.

The second electrode 23 and the fourth electrode 43 may also include a multilayered film. The multilayered film includes at least one selected from the group consisting of a ferromagnetic substance ("CoFe etc.") and an antiferromagnet (IrMn or PtMn). It is desirable that the thickness (the length in the first direction) of the film of the antiferromagnet (IrMn or PtMn) is not less than 5 nm and not more than 10 nm. It is desirable that the thickness of the film of the ferromagnetic substance ("CoFe etc.") is not less than 5 nm and not more than 60 nm.

The non-magnetic metal included in the second electrode 23 and the fourth electrode 43 includes at least one selected from the group consisting of Cu, Au, Ag, W, Mo, and Ru, for example. It is desirable that the non-magnetic metal includes at least one selected from the group consisting of Cu and Ru. At least one selected from the group consisting of Cu, Au, Ag, W, Mo, and Ru is hereafter called "Ru etc." It is desirable that the thickness of films such as "Ru etc." is not less than 3 nm and not more than 20 nm. The non-magnetic metal may also include an alloy including "Ru etc."

The second electrode 23 and the fourth electrode 43 may also include a multilayered film. One of the films included in the multilayered film includes "Ru etc." It is desirable that the thickness of the films such as "Ru" is not less than 0.1 nm and not more than 2 nm. In the magnetic recording and reproducing device 60 according to the embodiment, the orientation of the magnetization (the magnetization 24M and magnetization 44M) of the side shield of two reproducing element portions is made anti-parallel to each other. Thereby, the orientation of the magnetization of the free layer included in one of the reproducing element portions becomes anti-parallel to the orientation of the magnetization of the free layer included in the other one of the reproducing element portions. For example, it is desirable that a number of the non-magnetic metal layers included in the second electrode 23 differs from a number of the non-magnetic metal layers included in the fourth electrode 43. Thereby, the orientation of the magnetization of two free layers becomes anti-parallel to each other, for example.

As shown in FIG. 5, it is desirable that the second electrode 23 has a stacked configuration of CoFe/Ru/CoFe/IrMn/NiFe (five layers: a ferromagnetic layer, a non-magnetic layer, a ferromagnetic layer, an antiferromagnetic layer, and a ferromagnetic layer). The CoFe layer is provided between the first signal detecting portion 22 (and first side shield 24) and a NiFe layer. The Ru layer, the CoFe layer, and the IrMn layer are arranged in this order. In this example, the second electrode 23 includes a CoFe layer 23a, a Ru layer 23b, a CoFe layer 23c, an IrMn layer 23ds, and a NiFe layer 23e. The IrMn layer 23d is provided between the NiFe layer 23e and the first signal detecting portion 22. The CoFe layer 23c is provided between the IrMn layer 23d and the first signal detecting portion 22. The Ru layer 23b is provided between the CoFe layer 23c and the first signal detecting portion 22. The CoFe layer 23a is provided between the Ru layer 23b and the first signal detecting portion 22.

It is desirable that the fourth electrode 43 has a stacked configuration of CoFe/Ru/CoFe/Ru/CoFe/IrMn/NiFe (seven layers: a ferromagnetic layer, a non-magnetic layer, a ferromagnetic layer, a non-magnetic layer, a ferromagnetic layer, an antiferromagnetic layer, and a ferromagnetic layer). The CoFe layer is provided between the second signal detecting portion 42 (and second side shield 44) and the NiFe layer. The Ru layer, the CoFe layer, the Ru layer, CoFe, and the IrMn layer are arranged in this order.

In this example, the fourth electrode 43 includes a CoFe layer 43a, a Ru layer 43b, a CoFe layer 43c, a Ru layer 43d, a CoFe layer 43e, an IrMn layer 43f, and a NiFe layer 43g. The IrMn layer 43f is provided between the NiFe layer 43g and the second signal detecting portion 42. The CoFe layer 43e is provided between the IrMn layer 43f and the second signal detecting portion 42. The Ru layer 43d is provided between the CoFe layer 43e and the second signal detecting portion 42. The CoFe layer 43c is provided between the Ru layer 43d and the second signal detecting portion 42. The Ru layer 43b is provided between the CoFe layer 43c and the second signal detecting portion 42. The CoFe layer 43a is provided between the Ru layer 43b and the second signal detecting portion 42.

In this example, the orientation of the magnetization 43aM of the CoFe layer 43a is made to be same as (parallel with) the orientation of the magnetization 23aM of the CoFe layer 23a. The configuration of the second electrode 23 and the configuration of the fourth electrode 43 can be replaced mutually.

For example, one directional anisotropy is provided in the IrMn layer (antiferromagnetic layer) by an annealing in a manufacturing process. The direction of the anisotropy aligns along the cross track direction Dr, for example. Thereby, the orientation of the magnetization of the ferromagnetic layer contacting the IrMn layer becomes same orientation as the magnetization in the IrMn layer.

The pair of the first side shields 24 and the pair of the second side shields 44 include a magnetic body. The magnetic body includes "CoFe etc." At least one of the first side shields 24 and the second side shields 44 may also include a multilayered film. At least one of the multilayered films includes one of the "CoFe etc."

For example, the pair of first side shields 24 are exchange coupled with the second electrode 23. For example, the pair of second side shields 44 are exchange coupled with the fourth electrode 43. The exchange coupling includes a direct coupling between a magnetic layer and a magnetic layer, for example. The exchange coupling includes a magnetic coupling between a plurality of magnetic layers, for example. The magnetic coupling in the plurality of magnetic layers acts between the plurality of magnetic layers through the ultra-thin non-magnetic layer provided between the plurality of magnetic layers. The exchange coupling is a coupling through an Interface between magnetic layers, for example. The exchange coupling is a coupling through an interface between a magnetic layer and a non-magnetic layer, for example.

In the coupling through the Interface between the magnetic layer and the non-magnetic layer, the exchange coupling depends on the thickness of the non-magnetic layer. In this case, the exchange coupling acts in a range of not more than 2 nm for the thickness of the non-magnetic layer.

The exchange coupling differs from a static magnetic coupling by a leak magnetic field from an end portion of a magnetic layer. In the exchange coupling, it is possible that the ferromagnetic coupling bias magnetic field (or antiferromagnetic coupling bias magnetic field) acts between the plurality of magnetic layers. For example, in a case without externally applied bias magnetic field, the orientation of each magnetization of the plurality of magnetic layers becomes same by the exchange coupling action. This state is a ferromagnetic coupled state. For example, in another case without externally applied bias magnetic field, the orientation of each magnetization of the plurality of magnetic layers is opposite orientation by the exchange coupling action. This state is an antiferromagnetic coupled state.

In a case where an externally applied bias magnetic field etc. from the outside exists, the magnetization of the magnetic layer aligns along a direction decided by a combination of the applied bias magnetic field from the outside and the bias magnetic field by the exchange coupling. In a case where the externally applied bias magnetic field etc. from the outside exists, the ferromagnetic coupling bias magnetic field component by exchange coupling or the antiferromagnetic coupling magnetic field component by exchange coupling acts. The orientation of the bias magnetic field by exchange coupling is not necessarily same as the orientation of the magnetization in the plurality of magnetic layers.

In the embodiments, the direction of the magnetization in each of the pair of the first side shields 24 and of the pair of the second side shields 44 align along the second direction in the case where no externally applied magnetic field from the outside exists, for example. For example, the number of the non-magnetic layers included in the fourth electrode 43 is made larger than the number of the non-magnetic layers included in the second electrode 23. A difference between the number of the former and the number of the latter is 1, for example. Thereby, the magnetization of the fourth electrode 43 becomes opposite to the magnetization of the second electrode 23. The orientation of the opposite magnetization is obtained. Thereby, the orientation of the magnetization of one of the pair of the first side shields 24 becomes anti-parallel to the orientation of the magnetization of one of the pair of second side shields 44. The arrow in FIG. 5 shows the example of the magnetization direction in the magnetic layers. In FIG. 5, the orientation of the magnetization in one of the pair of the first side shields 24 is the same as that of the magnetization of the ferromagnetic layer (second electrode 23) adjacent to that. The orientation of the magnetization in one of the pair of the second side shields 44 is the same as that of the magnetization of the ferromagnetic layer (fourth electrode 43) adjacent to that. The orientation of the magnetization in one of the pair of the first side shields 24 is anti-parallel to the orientation of the magnetization in one of the pair of the second side shields 44.

Each of the first signal detecting portion 22 and the second signal detecting portion 42 includes a magneto-resistive effect element, for example. The characteristics of the magneto-resistive effect element changes depending on a change of space magnetic field distribution, for example. The magneto-resistive effect element outputs a signal according to this change. For example, in the case of perpendicular-magnetic-recording HDD, in a TMR (Tunnel Magneto Resistance) element, the output according to the orientation of each magnetization of the plurality of recording bits is obtained. The maximum output is obtained in the recording bit position.

Figure 6:
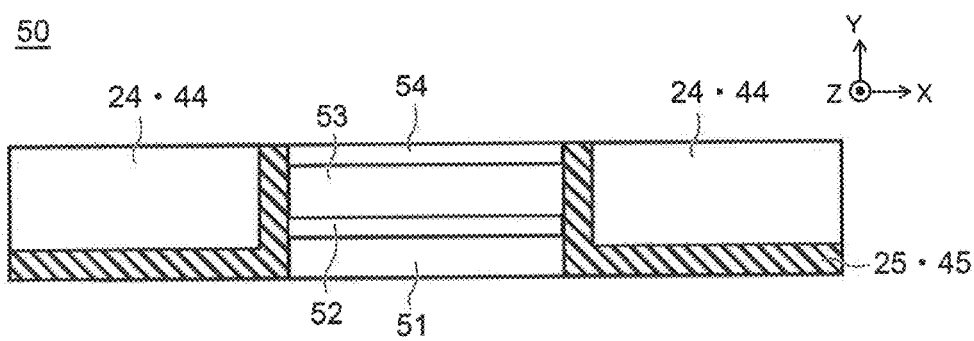
FIG. 6 is a schematic plan view illustrating a part of the magnetic recording and reproducing device according to the first embodiment.

FIG. 6 is a schematic plan view illustrating a part of the magnetic recording and reproducing device according to the first embodiment.

FIG. 6 shows examples of the first signal detecting portion 22 and the second signal detecting portion 42 used for the embodiment. Each of the first signal detecting portion 22 and the second signal detecting portion 42 includes one of the magneto-resistive effect elements 50.

The magneto-resistive effect element 50 has a pin layer 51, a first non-magnetic layer 52, a free layer 53, and a second non-magnetic layer 54. The pin layer 51, the first non-magnetic layer 52, the free layer 53, and the second non-magnetic layer 54 are arranged along the Y-axis direction.

The pin layer 51 (first magnetic fixed layer) includes a ferromagnetic substance. This ferromagnetic substance layer includes at least one selected from the group consisting of CoFe, CoFeB, and NiFe. The ferromagnetic substance layer may have stacked structure. In this stacked structure, Ru layer is provided between two magnetic layers. Each of two magnetic layers includes at least one selected from the group consisting of CoFe, CoFeB, and NiFe, for example. For example, the pin layer 51 may have the three-layer structure of CoFe/Ru/CoFe, for example. It is desirable that a thickness (a length in the Y-axis direction) of the ferromagnetic substance layer included in the pin layer 51 is not less than 1 nm and not more than 5 nm. It is desirable that a thickness of Ru layer is not less than 0.1 nm and not more than 2 nm, for example.

The first non-magnetic layer 52 includes an insulator or non-magnetic metal. The Insulator includes at least one selected from the group consisting of MgO, AlO (aluminum oxide), and TiO (Ti oxide), for example. The non-magnetic metal includes at least one selected from the group consisting of Cu and Ag, for example. It is desirable that a thickness (a length in the Y-axis direction) of the first non-magnetic layer 52 is not less than 1 nm and not more than 2 nm.

The free layer 53 includes at least one selected from the group consisting of CoFe, CoFeB, NiFe, CoFeMn, CoFeMnSi, CoFeGeSiCoMnSi, CoFeMnGe, CoMnGe, CoFeAlGe, and CoFeAlSi, for example. The free layer 53 may also include a film including at least one selected from the above-mentioned group, and another film including at least one selected from the above-mentioned group. These films stacked with each other. It is desirable that the free layer 53 has a stacked structure of CoFeB/NiFe/CoFe for example. The thickness (a length in the Y-axis direction) of the free layer 53 is not less than 2 nm and not more than 10 nm, for example.

It is desirable that the second non-magnetic layer 54 includes at least one selected from the group consisting of Cu and Ru. It is desirable that the thickness (a length in the Y-axis direction) of a film including at least one selected from the group consisting of Cu and Ru is not less than 0.2 nm and not more than 2 nm, for example.

FIG. 13 and FIG. 14 are tables showing the configuration of a part of the magnetic recording and reproducing device according to first embodiment.

FIG. 13 and FIG. 14 show an example of the layer configuration in the magnetic head 10 according to first embodiment, and the thickness of the layers.

By configuration shown in FIG. 13 and FIG. 14, the orientation of the magnetization in one of the pair of the first side shields 24 and the orientation of the magnetization in one of the pair of the second side shields 44 becomes anti-parallel to each other, for example. The orientation of the magnetization of the free layer 53 included in the first signal detecting portion 22 is anti-parallel to the orientation of the magnetization of the free layer 53 included in the second signal detecting portion 42.

By the above-mentioned configuration, a distance between the first signal detecting portion 22 and the second signal detecting portion 42 can be shortened, for example. For example, the influence of a skew (described later) can be reduced.

The magnetic head 10 including two reproducing element portions and the above-mentioned reproduction system are applied. The influence of the noise caused by the magnetic field in the cross track direction Dr generated form the magnetic recording medium can be suppressed, for example. For example, reproduced quality can be improved. For example, storage density can be improved.

(Second Embodiment)

Figure 9A:
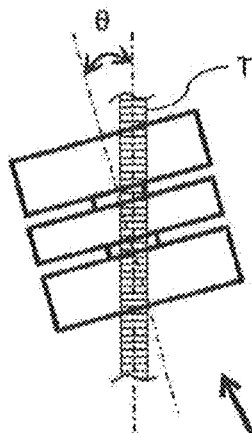
FIG. 9A to FIG. 9C are schematic views illustrating the magnetic recording and reproducing device according to a second embodiment.
Figure 9B:
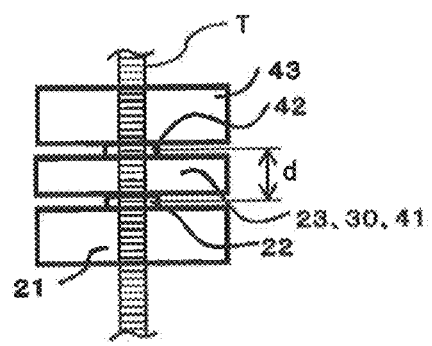
Figure 9C:
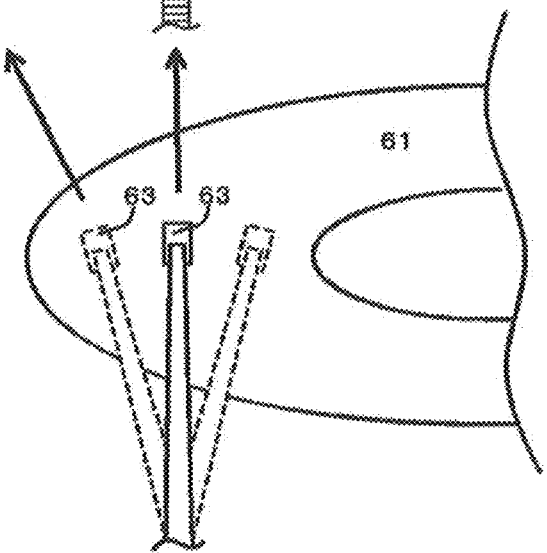

FIG. 9A to FIG. 9C are schematic views illustrating the magnetic recording and reproducing device according to a second embodiment.

These figures show an influence of the skew of the magnetic head 63 including two reproducing element portions. As shown in FIG. 9C, the magnetic head 63 reproduces the track information on the magnetic recording medium 61. The magnetic head 63 has the angle θ with respect to the track. A skew occurs. For example, the angle θ with respect to the track becomes large when the magnetic head 63 is located in the Inner circumference or the outer circumference of the magnetic recording medium 61.

FIG. 9A corresponds to a case where the skew exists. FIG. 9B corresponds to a case where no skew exists. When the magnetic head 63 is located in the Inner circumference of the magnetic recording medium 61, or when located in the circumference of outside, the influence of the skew becomes large.

In the case where the influence of the skew exists, in the magnetic head 63, when the distance d between the first signal detecting portion 22 and the second signal detecting portion 42 is large, the track read by the first signal detecting portion 22 becomes difficult to be same as the track read by the second signal detecting portion 42, for example. There is a case where reducing the noise becomes difficult.

A suitable range of the distance d between the first signal detecting portion 22 and the second signal detecting portion 42 is estimated as follows. For example, a track width T is 60 nm and the range of the skew is ±15 degrees. The track width T is 60 nm, which corresponds to 400 kTPI (Track Per Inch). When the range of the skew is ±15 degrees, the state where the magnetic head 63 floats on the magnetic recording medium 61 is stable, for example. It is estimated that the locational error of the magnetic head 63 is about 8 nm. When the distance d is approximately not less than 170 nm, in the case of the absolute value of the angle of the skew being 15 degrees, the first signal detecting portion 22 and the second signal detecting portion 42 are located on the same track. By making the distance d within this range, the same track can be reproduced by the first signal detecting portion 22 and the second signal detecting portion 42. The track width T becomes small with increasing of the storage capacity of HDD. In accordance with that, the distance d becomes small.

Figure 10:
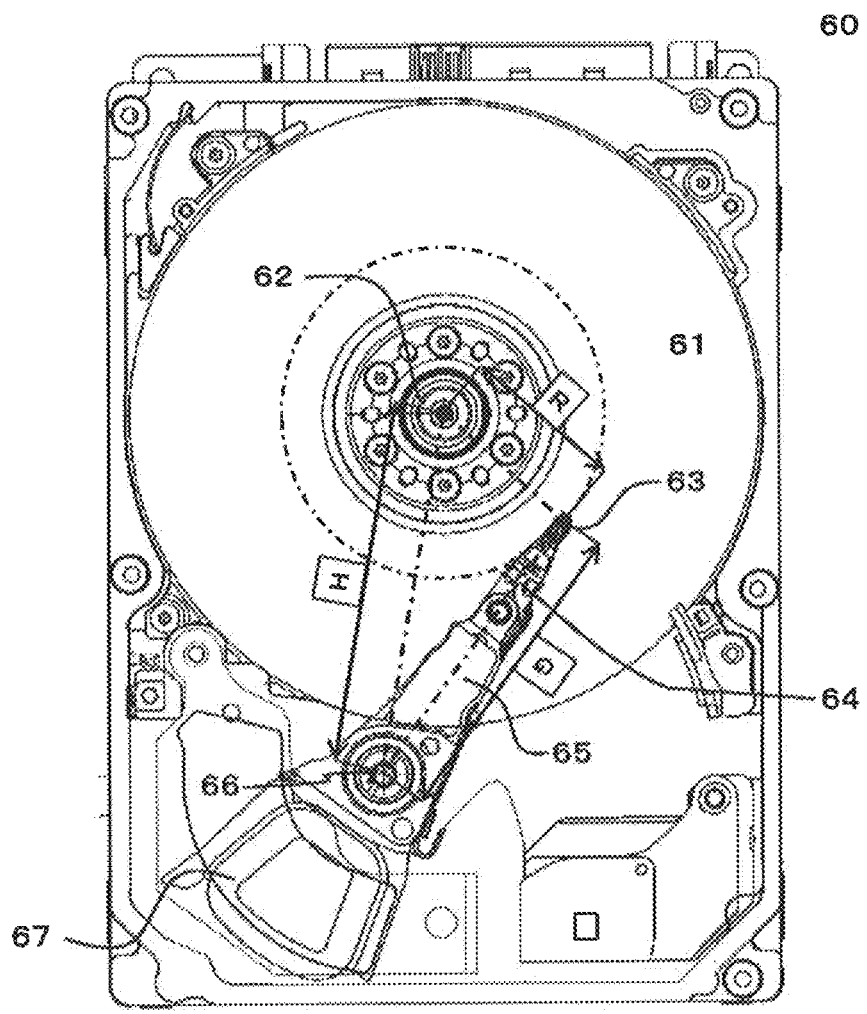
FIG. 10 is a schematic view illustrating the magnetic recording and reproducing device according to the embodiments.

FIG. 10 is a schematic view illustrating the magnetic recording and reproducing device according to the embodiments.

FIG. 10 shows the magnetic recording and reproducing device 60 (HDD device).

The magnetic recording and reproducing device 60 includes the magnetic recording medium 61, a spindle motor 62, and a magnetic head 63. The magnetic head 63 corresponds to the magnetic head 10 explained concerning the first embodiment. The magnetic head 10 includes two reproducing element portions.

A rotary actuator is used in the magnetic recording and reproducing device 60. The magnetic recording medium 61 rotates as a rotation axis of the spindle motor 62. The spindle motor 62 responds to the control signal from a drive controller (not shown).

A head slider (not shown) is provided in the end portion of the suspension 64. The magnetic head 63 (the magnetic head 10) is provided in the head slider. The magnetic head 63 (the magnetic head 10) has the medium opposing face (ABS: Air Bearing Surface). When the magnetic recording medium 61 rotates, a forcing pressure by the suspension 64 and a pressure generated at the medium opposing face are balanced. A distance between the medium opposing face and the surface of the magnetic recording medium 61 becomes a certain surfacing value. This state is maintained in the magnetic head 63.

The suspension 64 is connected to the end of the actuator arm 65. The actuator arm 65 includes a bobbin part etc. The bobbin part holds a drive coll. The voice coil motor 67 is provided in the other end of the actuator arm 65. The voice coil motor 67 is a kind of a linear motor. The voice coil motor 67 includes a drive coil and a magnetic circuit, for example. The drive coil is provided in the surroundings of the bobbin part of the actuator arm 65. The magnetic circuit includes a permanent magnet and a countering yoke. The drive coil is provided between the permanent magnet and the countering yoke.

The actuator arm 65 is held by ball bearings (not shown). The ball bearings are provided at upper and lower two sides of the bearing part 66. By the voice coil motor 67, the actuator arm 65 can rotate and slid. The magnetic recording head 63 is movable to the arbitrary positions on the magnetic recording medium 61.

A distance from the center of the magnetic recording medium 61 to the position of a data track is set to R. "R" is the length along the radial. A distance from the center of the bearing part 66 of the actuator arm 65 on which magnetic head is provided to the center of the spindle motor 62 is set to H. A distance from the center of the bearing part 66 of the actuator arm 65 to the position of two reproducing element portions provided in the magnetic head 63 is set to G. "G" is the distance along the radial. The position of two reproducing element portions is a position of the center of the position of the first signal detecting portion 22 and the position of the second signal detecting portion 42. The skew θ (degrees) is denoted by the following formula (1).

$$\theta = |\arccos((H^2 - R^2 - G^2)/(-2*R*G))*180/\pi| - 90 \quad (1)$$

For example, when increasing the value of "G" and decreasing the value of "H", the skew θ can be decreased. The values of "G" and "H" depend on the housing size of the magnetic recording and reproducing device 60. For example, in the magnetic recording and reproducing device of 2.5 inches or 3.5 Inches, it is desirable that the value of "G" is not less than 25 mm and not more than 60 mm, for example. It is desirable that the value of "H" is not less than 30 mm and not more than 110 mm, for example.

FIG. 11 is a schematic plan view illustrating a part of the magnetic recording and reproducing device according to the embodiments.

As shown in FIG. 11, the first reproducing element portion 20 includes the first electrode 21, the second electrode 23, the first signal detecting portion 22, and the first side shield 24. The second electrode 23 is apart from the first electrode 21 in the first direction (the Y-axis direction). The first signal detecting portion 22 is provided between the first electrode 21 and the second electrode 23. At least a part of the first side shield 24 overlaps the first signal detecting portion 22 in the second direction. The second direction is a direction crossing the first direction. In this example, the second direction is the X-axis direction.

The second reproducing element portion 40 includes the third electrode 41, the fourth electrode 43, the second signal detecting portion 42, and the second side shield 44. The direction connecting the first electrode 21 and the third electrode 41 aligns along the first direction (the Y-axis direction). The fourth electrode 43 is apart from the third electrode 41 in the first direction. The second signal detecting portion 42 is provided between the third electrode 41 and the fourth electrode 43. At least a part of the second side shield 44 overlaps the second signal detecting portion 42 in the second direction (in this example, the X-axis direction).

The first electrode 21 includes a ferromagnetic layer 21F, a non-magnetic layer 21N, and an antiferromagnetic layer 21A. The second electrode 23 includes a ferromagnetic layer 23Fa, a non-magnetic metal layer 23N, a ferromagnetic layer 23Fb, an antiferromagnetic layer 23AF, and a ferromagnetic layer 23Fc. Thus, the second electrode 23 includes a first non-magnetic metal layer (in this example, the non-magnetic metal layer 23N). The third electrode 41 includes the ferromagnetic layer 41F, the non-magnetic layer 41N, and the antiferromagnetic layer 41A. The fourth electrode 43 includes a ferromagnetic layer 43Fa, a non-magnetic metal layer 43Na, a ferromagnetic layer 43Fb, a non-magnetic metal layer 43Nb, a ferromagnetic layer 43Fc, an antiferromagnetic layer 43AF, and a ferromagnetic layer 43Fd. Thus, the fourth electrode 43 includes a second non-magnetic metal layer (in this example, the non-magnetic metal layer 23Na and the non-magnetic metal layer 23Nb).

For example, the number of the first non-magnetic metal layers included in the second electrode 23 is either one of odd number and even number, and the number of the second non-magnetic metal layers included in the fourth electrode 43 is other one of odd number and even number. In this example, the number of the first non-magnetic metal layers included in the second electrode 23 is 1. The number of the second non-magnetic metal layers included in the fourth electrode 43 is 2. For example, the difference between the number of first non-magnetic metal layers and the number of second non-magnetic metal layers is 1.

For the layer included these electrodes, the materials described in connection with FIG. 5 are applied, for example. The first electrode 21 includes a magnetic body. The magnetic body included in the first electrode 21 has magnetic shield property, for example.

As shown in FIG. 11, the direction connecting the first reproducing element portion 20 and the second reproducing element portion 40 aligns along the first direction (in this example, the Y-axis direction).

In this example, the magnetic head 10 includes the Insulating layer 30. The insulating layer 30 is provided between the first reproducing element portion 20 and the second reproducing element portion 40.

The second electrode 23 includes a plurality of magnetic layers (a ferromagnetic layer 23Fa, a ferromagnetic layer 23Fb, etc.). The first non-magnetic metal layer (a non-magnetic metal layer 23N) is provided between these magnetic layers.

The fourth electrode 43 includes a plurality of magnetic layers (a ferromagnetic layer 43Fa, a ferromagnetic layer 43Fb, a ferromagnetic layer 43Fc, etc.). The second non-magnetic metal layers (a non-magnetic metal layer 43Na, a non-magnetic metal layer 43Nb, etc.) are provided between these magnetic layers.

In this example, the second electrode 23 includes a first antiferromagnetic metal layer (an antiferromagnetic layer 23AF). In this example, the fourth electrode 43 includes a second antiferromagnetic metal layer (an antiferromagnetic layer 43AF).

The thickness (a length along the first direction) of the first non-magnetic metal layer is not less than 0.2 nm and not more than 2 nm, for example. The thickness (a length along the first direction) of the second non-magnetic metal layer is not less than 0.2 nm and not more than 2 nm.

The first non-magnetic metal layer includes at least one selected from the group consisting of Ru, Cu, Au, Ag, W, and Mo. The second non-magnetic metal layer includes at least one selected from the group consisting of Ru, Cu, Au, Ag, W, and Mo.

As shown in FIG. 11, the first reproducing element portion 20 further includes the first insulating portion 25. The first insulating portion 25 is provided between the first signal detecting portion 22 and the first side shield 24 and between the first side shield 24 and the first electrode 21.

The second reproducing element portion 40 further includes the second insulating portion 45. The second insulating portion 45 is provided between the second signal detecting portion 42 and the second side shield 44 and between the second side shield 44 and the third electrode 41.

The first side shield 24 includes a first region R1 contacting the second electrode 21. The second side shield 44 includes a second region R2 contacting the fourth electrode 43. The orientation of the magnetization (the magnetization 24M) in the first region R1 is anti-parallel to the orientation of the magnetization (the magnetization 44M) in the second region R2.

The second electrode 23 includes the CoFe layer 23a (See FIG. 5) and the Ru layer 23b (See FIG. 5), for example. The direction connecting the CoFe layer 23a and the Ru layer 23b aligns along the first direction (the Y-axis direction, See FIG. 5).

The fourth electrode 43 includes a CoFe layer (See FIG. 5, the CoFe layer 43a, the CoFe layer 43c, the CoFe layer 43e, etc.), and a Ru layer (See FIG. 5, the Ru layer 43b, Ru layer 43d, etc.), for example. The direction connecting the CoFe layer and Ru layer aligns along the first direction.

The distance between the first signal detecting portion 20 and the second signal detecting portion 40 is not less than 10 nm and not more than 170 nm, for example.

FIG. 12A and FIG. 12B are schematic plan views illustrating a part of the magnetic recording and reproducing device according to the embodiments.

FIG. 12A illustrates the first reproducing element portion 20. FIG. 12B illustrates the second reproducing element portion 40.

As shown in FIG. 12A, the first signal detecting portion 22 of the first reproducing element portion 20 includes a first magnetic film 51a, a second magnetic film 53a, and a first intermediate film 52a. The second magnetic film 53a is apart from the first magnetic film 51a in the first direction (the Y-axis direction). The first intermediate film 52a is provided between the first magnetic film 51a and the second magnetic film 53a. The first intermediate film 52a is non-magnetic. In this example, a non-magnetic film 54a is further provided. The second magnetic film 53a is provided between the non-magnetic film 54a and the first intermediate film 52a.

As shown in FIG. 12B, the second signal detecting portion 42 of the second reproducing element portion 40 includes a third magnetic film 51b, a fourth magnetic film 53b, and a second intermediate film 52b. The fourth magnetic film 53b is apart from the third magnetic film 51b in the first direction (the Y-axis direction). The second intermediate film 52b is provided between the third magnetic film 51b and the fourth magnetic film 53b. The second intermediate film 52b is non-magnetic. In this example, the non-magnetic film 54b is further provided. The fourth magnetic film 53b is provided between the non-magnetic film 54b and the second intermediate film 52b.

The first magnetic film 51a and the third magnetic film 51b are pin layers, for example. The second magnetic film 53a and the fourth magnetic film 53b are free layers, for example.

The magnetic recording and reproducing device 60 according to the embodiments includes the magnetic recording medium 61 on which bit information is recorded, the magnetic head 63 (the magnetic head 10), and the processor 1, for example. The magnetic head 63 includes the first reproducing element portion 20 and the second reproducing element portion 40. The magnetic head 63 reproduces the recorded bit information. The processor 1 processes the reproduced bit information to a first soft-decision information and a second soft-decision information. The processor 1 compares each of the first soft-decision information and the second soft-decision information based on a predetermined decision level DL. The processor 1 outputs information having a larger difference from the decision level DL as reproduced information.

The magnetic recording and reproducing device 60 according to the embodiments includes the magnetic recording medium 61, the magnetic head 63 (the magnetic head 10), and the processor 1, for example. The magnetic head 63 includes the first reproducing element portion 20 and the second reproducing element portion 40. The processor 1 acquires the first signal Sig1 obtained by reproducing the information recorded on first recording region RG1 of the magnetic recording medium 61 by the first reproducing element portion 20, and the second signal Sig2 obtained by reproducing the information recorded on first recording region RG1 by the second reproducing element portion 40 (See FIG. 2). The processor 1 outputs the output signal SigN according to one of the first signal and the second signal (See FIG. 2). The information of the larger one is outputted as the reproduced information.

As shown in FIG. 2, the processor 1 processes the first signal Sig1, and derives the first soft-decision information, and processes the second signal Sig2, and derives the second soft-decision information. The processor 1 derives the first difference between the first soft-decision information and the decision level DL, and the second difference between the second soft-decision information and the decision level DL. When the absolute value of the first difference is not less than the absolute value of the second difference, the one of the first signal Sig1 and the second signal Sig2 is the first signal Sig1. When the absolute value of the first difference is smaller than the absolute value of the second difference, the one of the first signal Sig1 and the second signal Sig2 is the second signal Sig2. The information having the larger one is outputted as the reproduced information.

The processor 1 acquires the third signal Sig3 and the fourth signal Sig4 (See FIG. 2). The third signal is obtained by reproducing the Information recorded on the second recording region RG2 of the magnetic recording medium 61 by the first reproducing element portion 20, for example. The fourth signal Sig4 is obtained by reproducing the Information recorded on the second recording region RG2 by the second reproducing element portion 40, for example. The processor 1 further outputs another output signal SigN according to one of the third signal Sig3 and the fourth signal Sig4. The information having the larger one is outputted as the reproduced information.

The processor 1 processes the third signal Sig3, and derives a third soft-decision information, and processes the fourth signal Sig4, and derives a fourth soft-decision information. The processor 1 derives the ad difference between the third soft-decision information and the decision level DL, and a fourth difference between the fourth soft-decision information and the decision level DL. When the absolute value of the third difference is more than the absolute value of the fourth difference, the one of the third signal Sig3 and the fourth signal Sig4 is the third signal Sig3. When the absolute value of the third difference is smaller than the absolute value of the fourth difference, the one of the third signal Sig3 and fourth signal Sig4 is fourth signal Sig4. The information having the larger one is outputted as the reproduced information.

In the magnetic reproducing method according to the embodiments, an output signal SigN according to either one of the first signal Sg1 and the second signal Sig2. The first signal Sg1 is obtained by reproducing the Information recorded on first recording region RG1 of the magnetic recording medium 61 by the first reproducing element portion 20. The second signal Sg2 is obtained by reproducing the information recorded on the first recording region RG1 by the second reproducing element portion 40, for example (See to FIG. 2).

The magnetic reproducing method according to embodiment is a magnetic reproducing method in the magnetic recording and reproducing device including the magnetic recording medium on which bit information is recorded, a magnetic head, and an processor. The magnetic head includes a first reproducing element portion and a second reproducing element portion. The magnetic head reproduces the recorded bit information. The processor processes the bit information which is acquired by each of the reproducing element portion of the first and the second reproducing element portions. The magnetic reproducing method includes processing the bit information reproduced by the first reproducing element portion to a first soft-decision information in the processor. The magnetic reproducing method includes processing the bit information reproduced by the second reproducing element portion to a second soft-decision information in the processor. The magnetic reproducing method includes comparing the first soft-decision information with the second soft-decision information based on a predetermined decision level in the processor. The magnetic reproducing method includes outputting the information having the larger difference from the decision level as a reproduced information.

According to embodiment, the magnetic recording and reproducing device and the magnetic reproducing method to reduce the influence of the noise superimposed on the adjacent to track can be provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, embodiments of the Invention are described with reference to specific examples. However, the invention is not limited to these specific examples. For example, one skilled in the art may similarly practice the invention by appropriately selecting specific configurations of components included in the magnetic recording and reproducing devices such as the magnetic recording medium, the magnetic head and processor, etc., from known art; and such practice is within the scope of the invention to the extent that similar effects can be obtained.

Further, any two or more components of the specific examples may be combined within the extent of technical feasibility and are included in the scope of the invention to the extent that the purport of the invention is included.

Moreover, all magnetic recording and reproducing devices practicable by an appropriate design modification by one skilled in the art based on the magnetic recording and reproducing devices described above as embodiments of the invention also are within the scope of the Invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the Inventions. The accompanying claims and their equivalents are intended to cover such forms or modifications as would fall within the scope and spirit of the invention.

What is claimed is:

1. A magnetic recording and reproducing device, comprising:
    a magnetic recording medium;
    a magnetic head including a first reproducing element portion and a second reproducing element portion; and
    a processor configured to acquire a first signal and a second signal, and to output an output signal according to either one of the first signal and the second signal, the first signal being obtained by reproducing information recorded on a first recording region by the first reproducing element portion, the second signal being obtained by reproducing the information recorded on the first recording region by the second reproducing element portion,
    wherein
    the first reproducing element portion includes:
       a first electrode,
       a second electrode apart from the first electrode in a first direction,
       a first signal detecting portion provided between the first electrode and the second electrode, and
       a first side shield, at least a part of the first side shield overlapping the first signal detecting portion in a second direction crossing the first direction,
    the second reproducing element portion includes:
       a third electrode,
       a fourth electrode apart from the third electrode in the first direction,
       a second signal detecting portion provided between the third electrode and the fourth electrode, and
       a second side shield, at least a part of the second side shield overlapping the second signal detecting portion in the second direction, a direction connecting the first electrode and the third electrode being along the first direction,
    the second electrode includes a first non-magnetic metal layer, and
    the fourth electrode includes a second non-magnetic metal layer.

2. The device according to claim 1, wherein
    the processor processes the first signal, and derives a first soft-decision information, and processes the second signal, and derives a second soft-decision information,
    the processor derives a first difference between the first soft-decision information and a decision level, and a second difference between the second soft-decision information and the decision level, and
    when an absolute value of the first difference is not less than an absolute value of the second difference, the either one of the first signal and the second signal is the first signal Sig1,
    when the absolute value of the first difference is smaller than the absolute value of the second difference, the either one of the first signal and the second signal is the second signal.

3. The device according to claim 1, wherein
    the processor acquires a third signal and a fourth signal,
    the third signal is obtained by reproducing information recorded on a second recording region of the magnetic recording medium by the first reproducing element portion, the fourth signal is obtained by reproducing the information recorded on the second recording region by the second reproducing element portion, the processor further outputs another output signal according to either one of the third signal and the fourth signal.

4. The device according to claim 1, wherein the first electrode includes a magnetic body.

5. The device according to claim 1, wherein a direction connecting the first reproducing element portion and the second reproducing element portion is along the first direction.

6. The device according to claim 1, wherein the magnetic head further includes an insulating layer provided between the first reproducing element portion and the second reproducing element portion.

7. The device according to claim 1, wherein
a number of the first non-magnetic metal layer included in the second electrode is either one of odd number and even number, and
a number of the second non-magnetic metal layer included in the fourth electrode is other one of odd number and even number.

8. The device according to claim 7, wherein a difference between the number of the first non-magnetic metal layer and the number of the second non-magnetic metal layer is 1.

9. The device according to claim 1, wherein the second electrode further includes a plurality of magnetic layers, and
the first non-magnetic metal layer is provided between the plurality of magnetic layers.

10. The device according to claim 1, wherein the second electrode includes a first antiferromagnetic layer.

11. The device according to claim 10, wherein the fourth electrode includes a second antiferromagnetic layer.

12. The device according to claim 1, wherein
a thickness of the first non-magnetic metal layer is not less than 0.2 nm and not more than 2 nm, and
a thickness of the second non-magnetic metal layer is not less than 0.2 nm and not more than 2 nm.

13. The device according to claim 1, wherein
the first non-magnetic metal layer includes at least one selected from the group consisting Ru, Cu, Au, W, and Mo, and
the second non-magnetic metal layer includes at least one selected from the group consisting Ru, Cu, Au, W, and Mo.

14. The device according to claim 1, wherein
the first reproducing element portion further includes an first insulating portion provided between the first signal detecting portion and the first side shield and between the first side shield and the first electrode, and
the second reproducing element portion further includes a second insulating portion provided between the second signal detecting portion and the second side shield and between the second side shield and the third electrode.

15. The device according to claim 1, wherein
the second electrode includes
a CoFe layer, and
a Ru layer,
a direction connecting the CoFe layer and the Ru layer is along the first direction.

16. The device according to claim 1, wherein
the fourth electrode includes
a CoFe layer, and
a Ru layer,
a direction connecting the CoFe layer and the Ru layer is along the first direction.

17. The device according to claim 1, wherein
the first side shield includes a first region contacting the second electrode,
the second side shield includes a second region contacting the fourth electrode,
an orientation of a magnetization in the first region is anti-parallel to an orientation of a magnetization in the second region.

18. The device according to claim 1, wherein a distance between the first reproducing element portion and the second reproducing element portion is not less than 10 nm and mot more than 170 nm.

19. A magnetic reproducing method, comprising outputting an output signal according to either one of a first signal and a second signal, the first signal being obtained by reproducing information recorded on a first recording region of a magnetic recording medium by a first reproducing element portion, the second signal being obtained by reproducing the information recorded on the first recording region by a second reproducing element portion
wherein
the first reproducing element portion and the second reproducing element portion are included in a magnetic head,
the first reproducing element portion includes:
a first electrode,
a second electrode apart from the first electrode in a first direction,
a first signal detecting portion provided between the first electrode and the second electrode, and
a first side shield, at least a part of the first side shield overlapping the first signal detecting portion in a second direction crossing the first direction,
the second reproducing element portion includes:
a third electrode,
a fourth electrode apart from the third electrode in the first direction,
a second signal detecting portion provided between the third electrode and the fourth electrode, and
a second side shield, at least a part of the second side shield overlapping the second signal detecting portion in the second direction, a direction connecting the first electrode and the third electrode being along the first direction,
the second electrode includes a first non-magnetic metal layer, and
the fourth electrode includes a second non-magnetic metal layer.

* * * * *